US008345556B2

(12) United States Patent  
Mitsutake

(10) Patent No.: US 8,345,556 B2  
(45) Date of Patent: Jan. 1, 2013

(54) CONGESTION CONTROL SYSTEM, SERVICE EDGE NODE, GUIDANCE SERVER, CONGESTION CONTROL METHOD, PROGRAM THEREFOR, AND RECORDING MEDIUM RECORDED THEREWITH

(75) Inventor: Haruo Mitsutake, Tokyo (JP)

(73) Assignee: NEC Corporation, Tokyo (JP)

( * ) Notice: Subject to any disclaimer, the term of this patent is extended or adjusted under 35 U.S.C. 154(b) by 320 days.

(21) Appl. No.: 12/049,043

(22) Filed: Mar. 14, 2008

(65) Prior Publication Data

US 2008/0239964 A1 Oct. 2, 2008

(30) Foreign Application Priority Data

Mar. 27, 2007 (JP) .................................. 2007-080467

(51) Int. Cl.
*G01R 31/08* (2006.01)
*G06F 11/00* (2006.01)
*G08C 15/00* (2006.01)

(52) U.S. Cl. ....................................................... 370/237

(58) Field of Classification Search .................... 370/237
See application file for complete search history.

(56) References Cited

U.S. PATENT DOCUMENTS

| | | | |
|---|---|---|---|
| 6,798,745 B1 * | 9/2004 | Feinberg | 370/235 |
| 2003/0123388 A1 | 7/2003 | Bradd | |
| 2004/0151299 A1 | 8/2004 | Franz et al. | |
| 2006/0251050 A1 * | 11/2006 | Karlsson | 370/352 |

FOREIGN PATENT DOCUMENTS

| | | |
|---|---|---|
| EP | 1528818 A2 * | 5/2005 |
| JP | 2005269197 A | 9/2005 |
| KR | 2006133829 A | 12/2006 |
| WO | 2007009369 A1 | 1/2007 |

OTHER PUBLICATIONS

European Seach Report for EP Application 08152578.4, search completed Jul. 24, 2008.
Korean Office Action for KR10-2008-28566 issued Nov. 9, 2009.
European Patent Office (EPO) office action in corresponding EPO patent application 08 152 578.4, dated Jul. 20, 2010.
Japanese Office Action for JP2007-080467 issued May 24, 2011.
H. Nakanishi et al., "Traffic Control Technique for VoIP Service", NTT Technical Journal, vol. 13, No. 3; The Telecommunication Association, Mar. 1, 2001, pp. 79-84.

* cited by examiner

*Primary Examiner* — Mark Rinehart
*Assistant Examiner* — Maharishi Khirodhar

(57) ABSTRACT

In an edge region between an access network for connection to an IP communication terminal of a subscriber via a gateway and a core network for providing the subscriber with an IP telephone service, a service edge node and a guidance server are disposed. The service edge node controls a call initiation request received from the subscriber based on a congested state of the core network and a priority given to the subscriber. The guidance server transmits guidance to the subscriber without the intermediation of the core network.

19 Claims, 5 Drawing Sheets

CONGESTION CONTROL SYSTEM, SERVICE EDGE NODE, GUIDANCE SERVER, CONGESTION CONTROL METHOD, PROGRAM THEREFOR, AND RECORDING MEDIUM RECORDED THEREWITH

This application is based upon and claims the benefit of priority from Japanese patent application No. 2007-080467, filed on Mar. 27, 2007, the disclosure of which is incorporated herein in its entirety by reference.

BACKGROUND OF THE INVENTION

1. Field of the Invention

The present invention relates to a congestion control system, a service edge node, a guidance server, a congestion control method, a congestion control program, and a program recording medium, and more particularly, to a congestion control system, a service edge node, a guidance server, a congestion control method, a congestion control program, and a program recording medium which are applied to an IP network.

2. Description of the Related Art

In recent years, as described in the disclosure of JP 2005-269197 A titled "INTERNET PROTOCOL TELEPHONY SYSTEM AND CONTROL METHOD FOR INTERNET PROTOCOL TELEPHONY SYSTEM", significant improvements in sound quality are provided even to a communication mode of using an IP packet for transmission/reception of sound information. Under such circumstances, as a telephone network, an IP telephone service network (service network on an IP network) is rapidly becoming widespread in place of the conventional public switching telephone network (PSTN).

However, as distinct from the conventional telephone network based on a telephone switchboard (PSTN), most of IP telephony networks generally have a configuration in which devices, namely, call control servers, for accommodating subscribers are not distributed in different locations, but concentrated in one location or at most several locations. In addition, one call control server accommodates far more subscribers than one conventional telephone switchboard, and there coexist information items on subscribers in various areas within a single call control server. Therefore, if a failure such as a congestion occurs, an influence thereof is exerted across a wide range of areas.

In other words, in the IP telephony network, devices that exchange control signals for IP telephones such as the call control servers for accommodating subscribers are disposed concentratedly. If a large amount of IP telephone calls occur, much traffic is concentrated on the call control server or the like accommodating subscribers in a wide range of areas, which causes a congested state in the call control server or the like, thereby leading to a state where the IP telephone call is hard to be connected or cannot be connected at all.

In addition, a guidance server, namely, a guiding device, for providing subscribers with various guidance services such as a voice guidance operates in cooperation with the call control server for accommodating subscribers. Therefore, if the call control server falls into such a congested state as to fail in processing of a call initiation request from a subscriber, the guiding device cannot in turn provide a guidance service relating to the occurrence of the congested state.

As a result, the subscriber knows nothing about what is happening, and repeatedly reinitiates the IP telephone call, which accelerates the congested state. Accordingly, the congestion spreads across the entire IP telephony network, and the congested state continues almost without end, resulting in such a critical situation that considerable time is required for a recovery.

SUMMARY OF THE INVENTION

The present invention has been made in view of the above-mentioned circumstances, and an exemplary object thereof is to provide a congestion control system for controlling an IP traffic flow by monitoring a congested state of an IP telephony network, the congestion control system being configured by disposing a service edge node for controlling a call initiation request from a subscriber in a boundary region, namely, an edge region, between an access network for connecting subscribers and a core network for accommodating subscribers and providing an IP telephone service, thereby making it possible, when it is detected that a host-side device such as a call control server accommodating subscribers falls into a congested state due to concentration of traffic, to prevent the traffic from being concentrated on the host-side device such as a call control server and suppress an influence range of congestion to minimum.

The present invention has another exemplary object to configure the congestion control system by disposing a guidance server, namely, a guiding device, for providing subscribers with various guidance services (such as a voice guidance and a video guidance) in the edge region serving as an entrance through which the subscribers are accommodated, thereby making it possible to positively notify an IP communication terminal such as a telephone or a PC of a guidance service without cooperation with the host-side device such as the call control server.

In order to achieve the above-mentioned objects, a congestion control system, a service edge node, a guidance server, a congestion control method, a congestion control program, and a program recording medium according to the present invention adopt configurations characterized as follows.

As a first exemplary aspect of the present invention, a congestion control system for controlling a congestion of an IP telephony network in which a communication processing of a telephone call is performed by use of an IP packet includes: a service edge node for controlling an IP telephone call initiation request received from an IP communication terminal based on a congested state of a core network for providing a subscriber with an IP telephone service; and a guidance server for providing a guidance service to the IP communication terminal without intermediation of the core network, the service edge node and the guidance server being disposed in an edge region located between an access network for connection to the IP communication terminal of the subscriber and the core network is provided.

As second exemplary aspect of the present invention, a service edge node, which constitutes a congestion control system for controlling a congestion of an IP telephony network in which a communication processing of a telephone call is performed by use of an IP packet, in which the service node is disposed in an edge region located between an access network for connection to an IP communication terminal of a subscriber and a core network for providing the subscriber with an IP telephone service, and serves to control an IP telephone call initiation request received from the IP communication terminal based on a congested state of the core network is provided.

As third exemplary aspect of the present invention, a guidance server, which constitutes a congestion control system for controlling a congestion of an IP telephony network in which a communication processing of a telephone call is performed by use of an IP packet, in which the guidance server is disposed in an edge region located between an access network for connection to an IP communication terminal of a subscriber and a core network for providing the subscriber with an IP telephone service; and serves to provide a guidance service to the IP communication terminal without intermediation of the core network is provided.

As fourth exemplary aspect of the present invention, a congestion control method of controlling a congestion of an IP telephony network in which a communication processing of a telephone call is performed by use of an IP packet, including: controlling, by a service edge node disposed in an edge region located between an access network for connection to an IP communication terminal of a subscriber and a core network for providing the subscriber with an IP telephone service, an IP telephone call initiation request received from the IP communication terminal based on a congested state of the core network; and providing, by a guidance server disposed in the edge region, a guidance service to the IP communication terminal is provided.

As fifth exemplary aspect of the present invention, a congestion control program for causing a computer to execute the congestion control method mentioned above.

As sixth exemplary aspect of the present invention, a computer-readable program recording medium, which is recorded with the above-mentioned congestion control program.

DETAILED DESCRIPTION OF THE PREFERRED EMBODIMENTS

Hereinafter, the accompanying drawings will be referenced to describe a congestion control system, a service edge node, a guidance server, a congestion control method, a congestion control program, and a program recording medium according to a preferred exemplary embodiment of the present invention. The following description is directed mainly to the congestion control system and the congestion control method according to the exemplary embodiment of the present invention. However, one or a plurality of steps (sequences) may be realized as a congestion control program implemented as a computer-executable program, or the congestion control program may be provided by being stored in a computer-readable medium.

Characteristics of the Present Invention

Prior to the description of the exemplary embodiment of the present invention, the characteristics of the present invention will be overviewed first. The present invention is characterized in that a congestion control system, which is configured to include at least a service edge node for regulating a call initiation operated by a subscriber based on a congested state of a core network and a guidance server for transmitting various guidances (such as a voice guidance and a video guidance) to the subscriber that are located in an edge region located between the core network for providing the subscriber with an IP telephone service and an access network for mediating access from the subscriber to the core network, is provided in an IP telephony network to thereby make it possible to control a call initiation request from the subscriber based on the congested state of the core network and a priority assigned to the subscriber as well.

To be specific, if the IP telephony network falls into a congested state, the present invention, which provides the following mechanism, thereby performs a processing of controlling a call initiation request from a subscriber based on the priority assigned to the subscriber on the service edge node of the congestion control system located in the edge region serving as an entrance to the IP telephony network.

That is, the service edge node receives congestion information from an external device such as a congestion control node for detecting a congested state of the core network connected to the call control server and the like to thereby judge which of a normal state and a congested state the call control server accommodating subscribers handled by the service edge node is in, and if the call control server is judged to be in the congested state, further judge which of a lightly congested state and a heavily congested state the call control server is in. Upon reception of a call initiation request from a subscriber, the service edge node references a priority assigned to the subscriber to perform switching control with respect to a transfer destination of the call initiation request from the subscriber.

Figure 2:
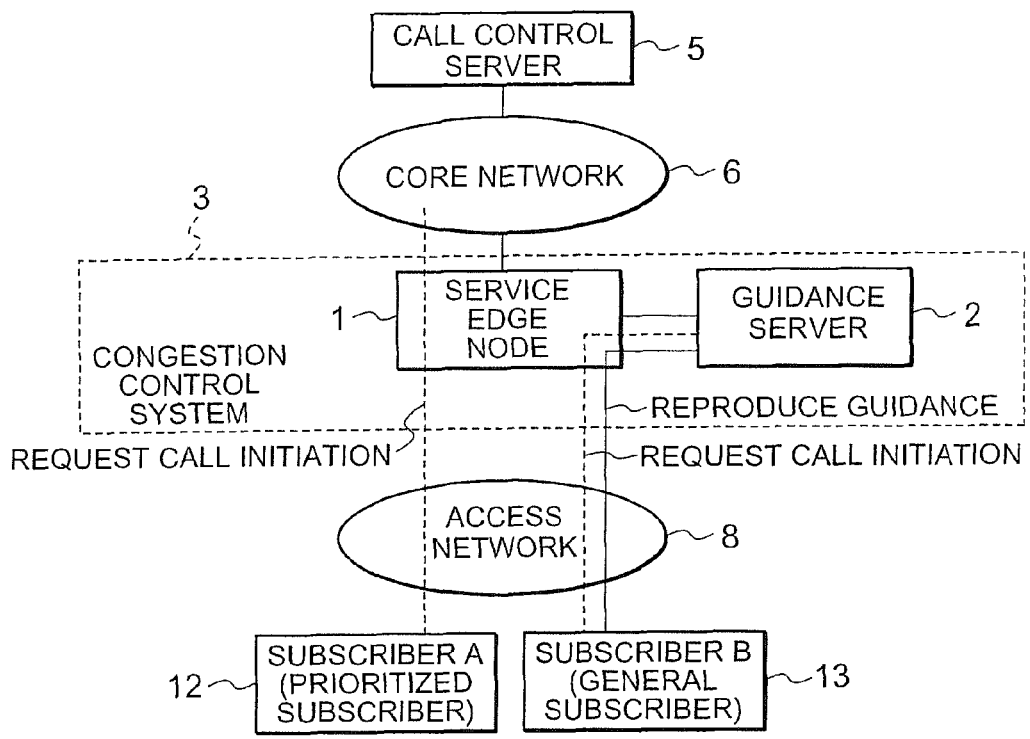
FIG. 2 is an explanatory diagram showing an example of how the congestion control system according to the exemplary embodiment of the present invention operates during a lightly congested state.
Figure 3:
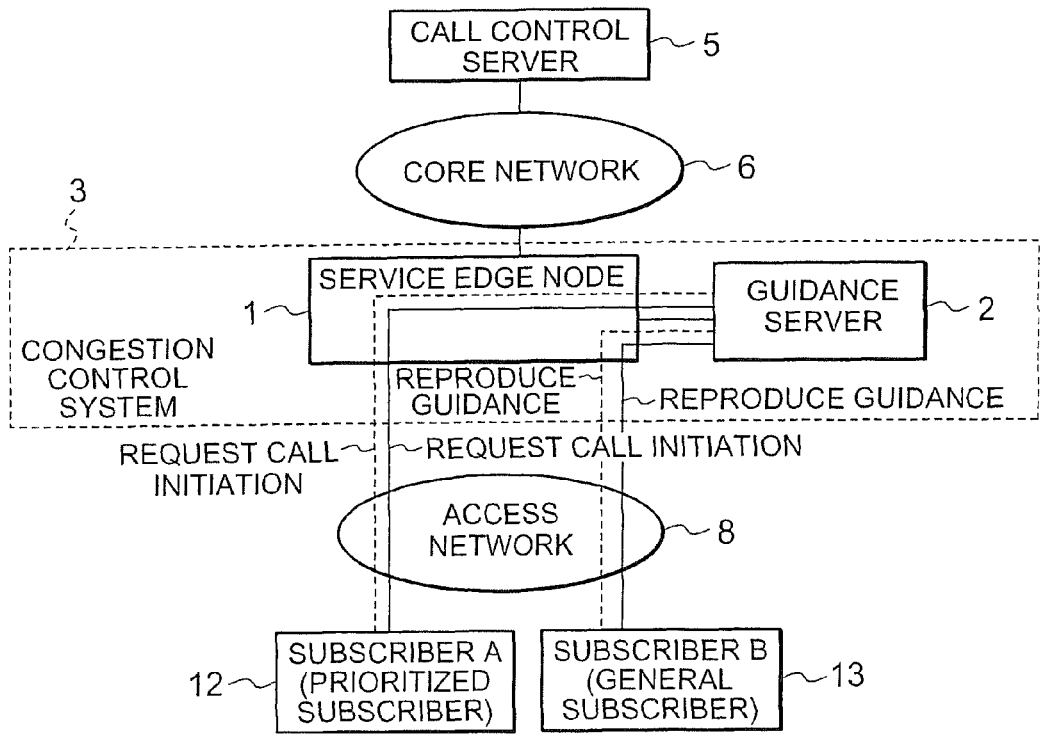
FIG. 3 is an explanatory diagram showing an example of how the congestion control system according to the exemplary embodiment of the present invention operates during a heavily congested state.

FIGS. 2 and 3 are used to further describe examples of an operation performed when a congestion occurs in the call control server connected to the host-side core network. In the description, a prioritized subscriber involved in an urgent call, for example, a prioritized subscriber such as a police office or a fire department is represented as a subscriber A, while a general subscriber whose call is less urgent is represented as a subscriber B. FIG. 2 is an explanatory diagram showing an example of how the congestion control system according to the exemplary embodiment of the present invention operates during a lightly congested state, and FIG. 3 is an explanatory diagram showing an example of how the congestion control system according to the exemplary embodiment of the present invention operates during a heavily congested state.

FIGS. 2 and 3 both show a configuration in which a congestion control system 3 is disposed in the edge region located between a core network 6 for connection to a call control server 5 for an IP telephone call and an access network 8 for connection to a subscriber A (prioritized subscriber) 12 and a subscriber B (general subscriber) 13, the congestion control system 3 including: at least a service edge node 1 for controlling a connection service for connecting the subscriber A 12 and subscriber B 13 with the core network 6 based on the congested state of the core network 6, the call control server 5, or the like and the subscriber type; and a guidance server 2 for transmitting various guidances (such as a voice guidance and a video guidance) to the subscriber A 12 and the subscriber B 13 and a control signal such as a connection impossibility notification signal.

For example, in a case where a lightly congested state has occurred in the host-side call control server 5 accommodating subscribers, as shown in FIG. 2, if the service edge node 1 within the congestion control system 3 identifies that the subscriber who has made a call initiation request is the subscriber A 12, the service edge node 1 transfers the call whose initiation has been requested to a normal route as usual in order to effect the connection to the call control server 5. However, if the service edge node 1 identifies that the subscriber who has made a call initiation request is the subscriber B 13, the service edge node 1 switches the connection destination into the guidance server 2 because the normal processing further raises the load on the call control server 5, which accelerates the congested state.

As a result, the guidance server 2 provides the subscriber B 13 being a general subscriber with the guidance information "The telephone lines are busy right now, and so please try again after a while." as a voice guidance or a video guidance. The guidance service using a guidance server (guiding device) is provided in the conventional IP telephony network as well. However, in the conventional IP telephony network, the guidance server (guiding device) is configured to be connected to the subscriber via a call control server after establishing a connection to the call control server, which neither reduces the load on the call control server nor assures that a guidance service can be provided to the subscriber without fail.

On the other hand, in the present invention, the guidance server 2 is disposed in the edge region serving as an entrance to the core network 6 in order to reduce the load on the host-side devices such as the call control server 5 and prevent the congested state from being further accelerated, and can provide a guidance service to a subscriber, for example, the subscriber B 13 without the intermediation of the host-side call control server 5.

The guidance server 2 not only provides the subscriber with voice and video guidance services but also can transmit a connection impossibility notification signal indicating that a call initiation request from an IP telephone has been rejected to an IP communication terminal of the subscriber B 13 or the like who has made the call initiation request. Upon reception of the connection impossibility notification signal, the IP communication terminal may also edit the signal into the information "The IP telephone lines are so busy right now that the call initiation request cannot be accepted within 10 minutes." to display the information on a display of the IP communication terminal.

In addition, the access network 8 for connection to a subscriber or a gateway for managing a gateway function with respect to the access network 8 may receive the connection impossibility notification signal addressed to the subscriber to allow the access network 8 or the gateway itself to regulate a call to the IP telephony network. Alternatively, instead of transferring the connection impossibility notification signal to the subscriber, the access network 8 or the gateway may terminate the connection impossibility notification signal, edit the signal into the text information "The IP telephone lines are so busy right now that the call initiation request cannot be accepted within 10 minutes." or graphic information, and transmit the edited text information or graphic information to the subscriber.

Meanwhile, in a case where the load on the call control server 5 further increases to cause such a heavily congested state as to fail in responding to a connection request, as shown in FIG. 3, the service edge node 1 within the congestion control system 3 shifts to a state in which any call initiation request made with respect to the call control server 5 is not received and in which call initiation requests from all subscribers including a prioritized subscriber are redirected to the guidance server 2. Even in the case of such a heavy congestion as well as the case of the light congestion shown in FIG. 2, as described above, the guidance server 2 not only provides the subscriber with voice and video guidance services but also can transmit a connection impossibility notification signal indicating that a call initiation request from an IP telephone has been rejected to the IP communication terminal of the subscriber A 12, the subscriber B 13, or the like, the access network 8, or the gateway.

Configuration of the Exemplary Embodiment

Figure 1:
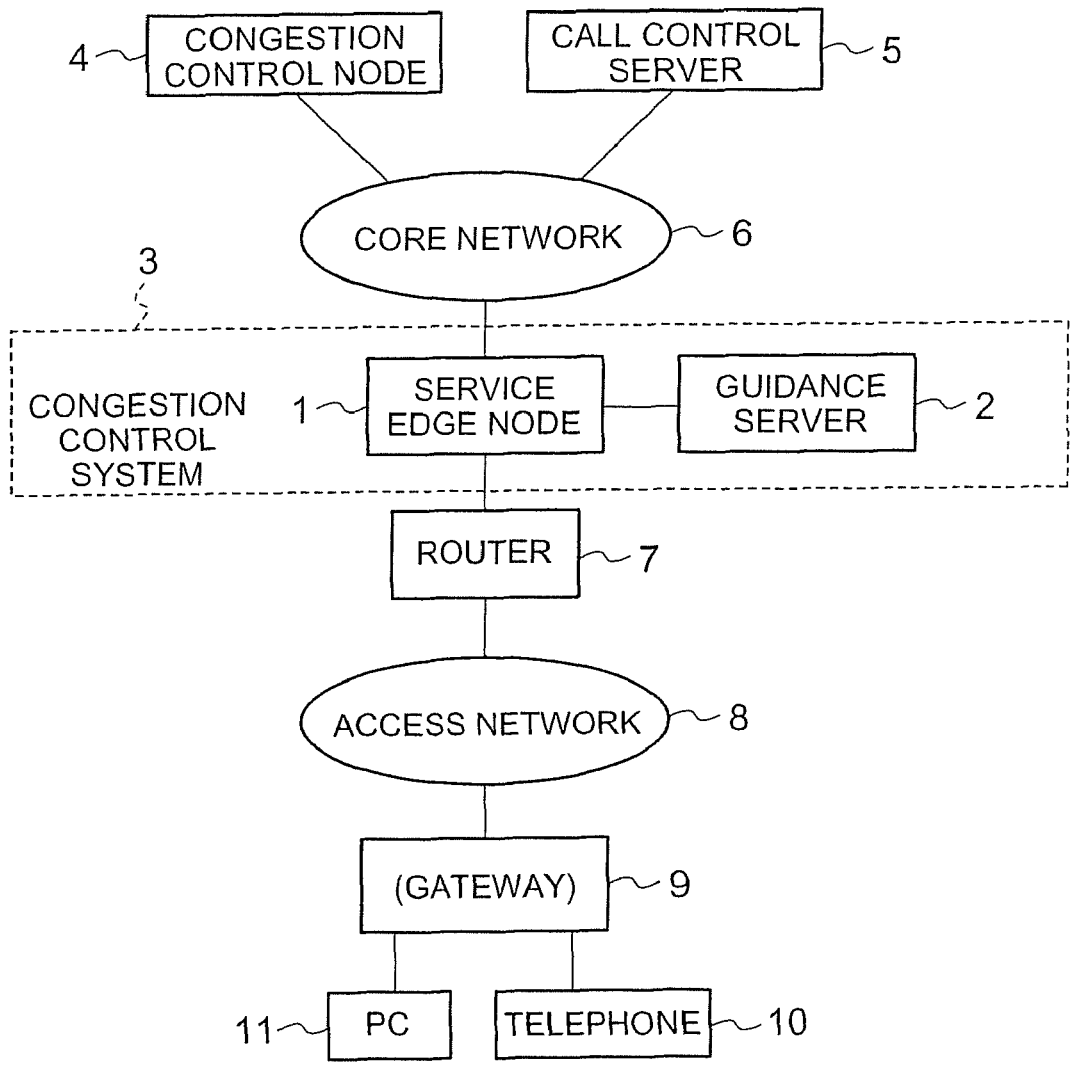
FIG. 1 is a system configuration diagram showing an example of a network configuration to which a congestion control system according to an exemplary embodiment of the present invention is applied.

FIG. 1 is a system configuration diagram showing an example of a network configuration to which the congestion control system according to the exemplary embodiment of the present invention is applied. In the system configuration shown in FIG. 1, the congestion control system 3, which is configured to include at least the service edge node 1 and the guidance server 2, is disposed in the edge region between the access network 8 for connection to the IP communication terminal of a subscriber and the core network 6 for providing a subscriber with an IP telephone service, to thereby make it possible to regulate a call initiation request from the IP communication terminal such as a telephone 10 or a PC 11 based on the congested state of the core network 6 or the host-side device such as the call control server 5 accommodating subscribers.

According to the congestion control system thus configured, when information indicating the congested state of the host-side core network 6 or call control server 5 is notified by, for example, an external device such as a congestion control node 4, the service edge node 1 can regulate the call initiation request from the IP communication terminal such as the telephone 10 or the PC 11 in the edge region serving as an entrance to the core network 6 for providing the IP telephone service, and can positively avoid the traffic from being concentrated on the host-side device such as the call control server 5. Further, without the intermediation of the host-side core network 6 or call control server 5 that has fallen into a congested state, the guidance server 2 can positively transmit a voice or video guidance for notification of a congestion or a connection impossibility notification signal from the edge region serving as an entrance to the core network 6 to the IP communication terminal such as the telephone 10 or the PC 11 of a subscriber via the router 7, the access network 8, and a gateway 9 (or modem) for managing a gateway function.

The service edge node 1 represents a device having a function of controlling a voice over IP (VoIP) service such as a session border controller (SBC) function, and controls a call initiation request from a subscriber based on the congested state of the core network 6 or the host-side device such as the call control server 5 and the subscriber type. The guidance server 2 represents a device for providing a voice guidance and a video guidance to the IP communication terminal such as the telephone 10 or the PC 11. In addition, the guidance server 2 not only reproduces guidances such as the voice and video guidances for the IP communication terminal such as the telephone 10 or the PC 11 but also transmits a control signal such as the connection impossibility notification signal indicating that the call cannot be connected, to the IP communication terminal such as the telephone 10 or the PC 11, the access network 8, or the gateway 9.

In this exemplary embodiment, the service edge node 1 and the guidance server 2 are described as functionally separate components, but may be configured as separate devices or may be configured as a single device having both of the functions. Note that the congestion control node 4 shown in FIG. 1 represents a device for monitoring the congested state of the core network 6 or the host-side device such as the call control server 5, and notifying the occurrence of the congested state to the call control server 5 itself or the service edge node 1 and the guidance server 2 that constitute the congestion control system 3.

Description of an Operation of the Exemplary Embodiment

Figure 4:
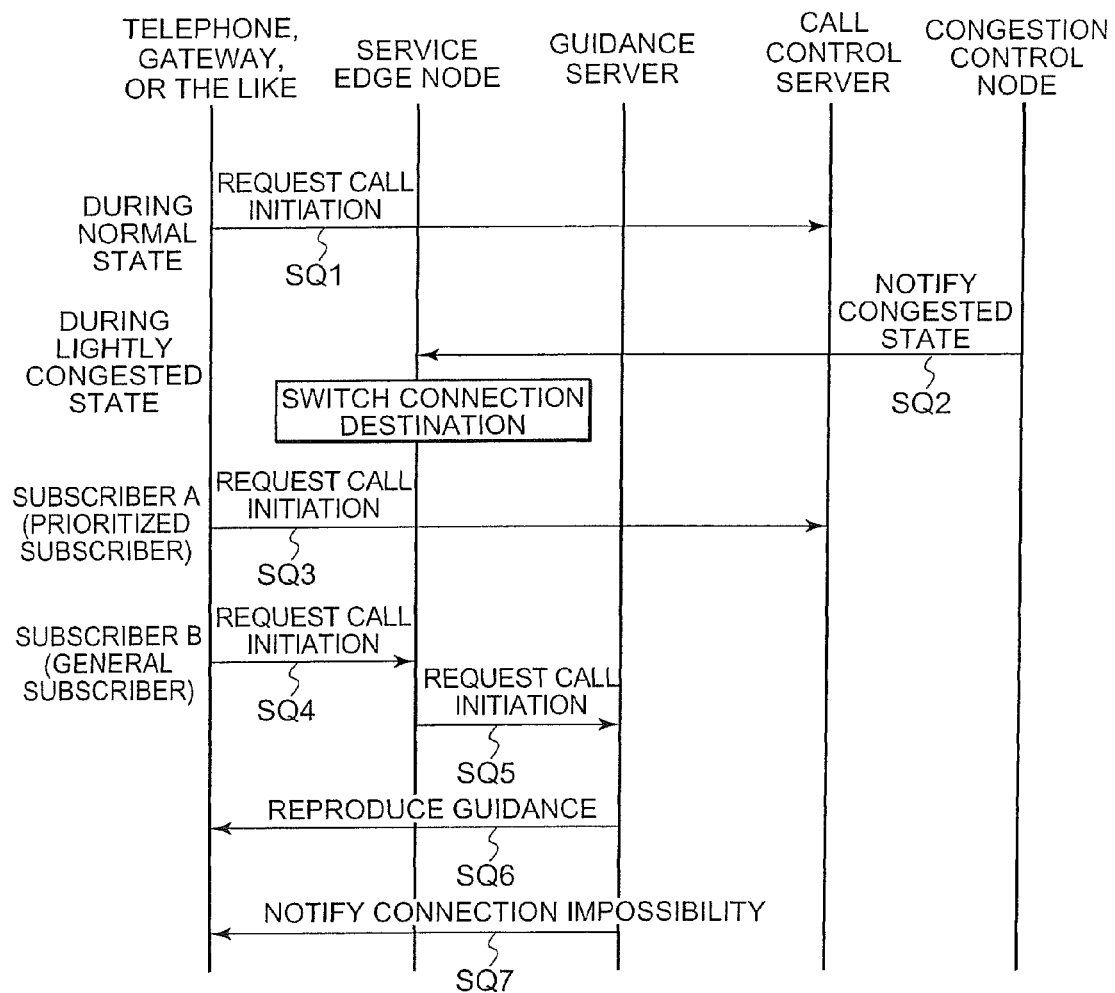
FIG. 4 is a sequence diagram showing an example of how the congestion control system according to the exemplary embodiment of the present invention operates during the lightly congested state.
Figure 5:
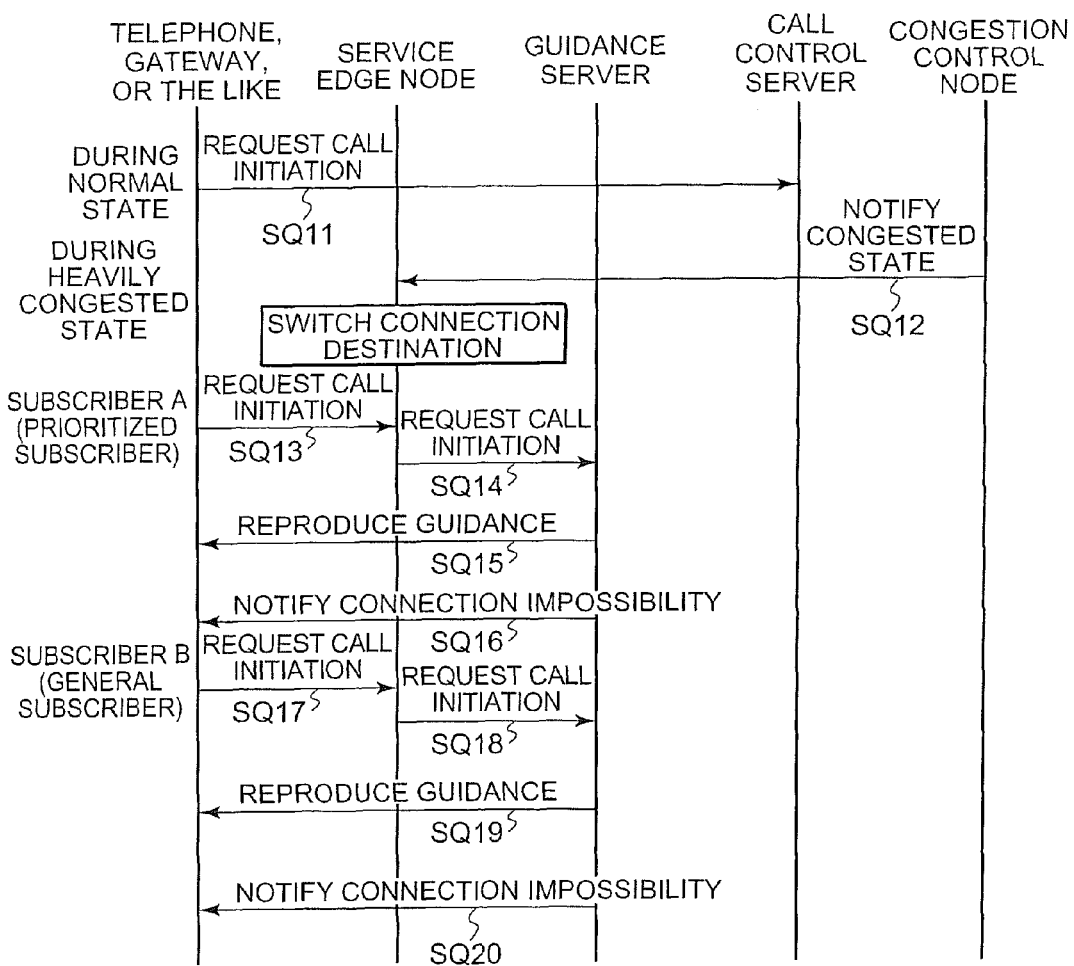
FIG. 5 is a sequence diagram showing an example of how the congestion control system according to the exemplary embodiment of the present invention operates during the heavily congested state.
Figure 6:
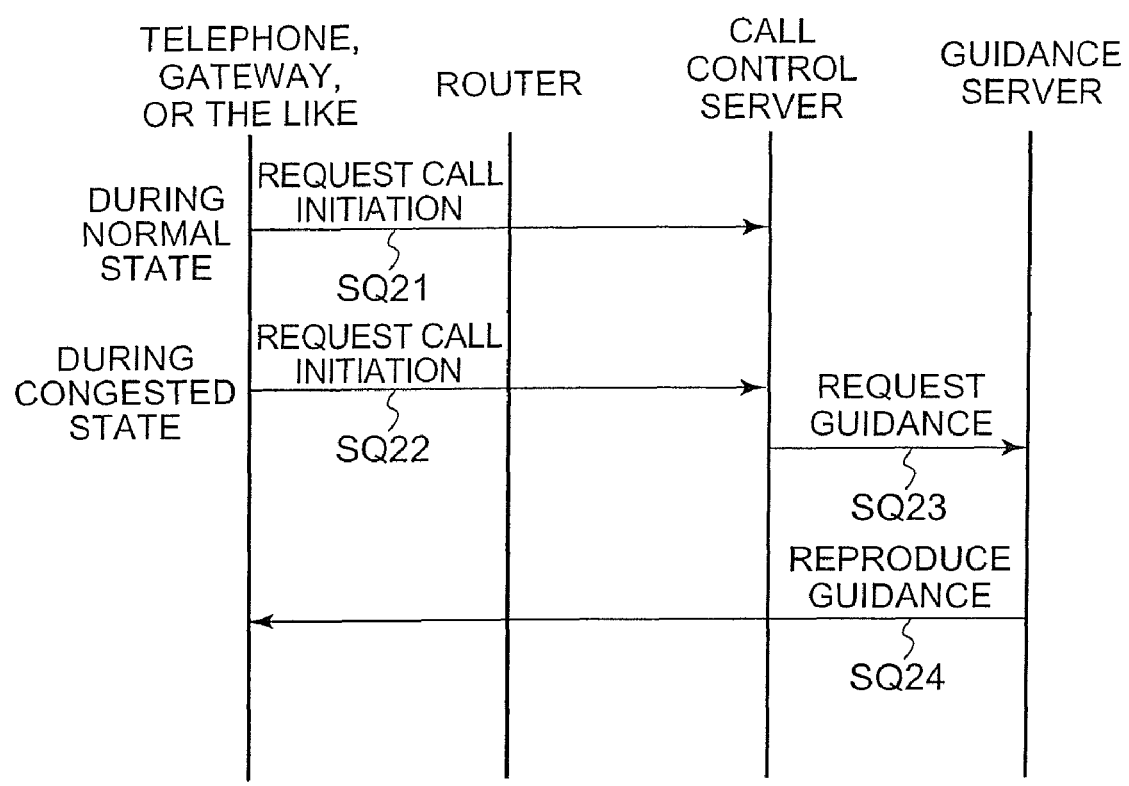
FIG. 6 is a sequence diagram for explaining a congestion control operation performed in a conventional IP telephony network.

Next, sequence diagrams of FIGS. 4 to 6 are referenced to describe an operation of the congestion control system 3 shown in FIG. 1 as an example of the present invention in comparison with a congestion control operation performed in a conventional IP telephony network. FIG. 4 is the sequence diagram showing an example of how the congestion control system according to the exemplary embodiment of the present invention operates during the lightly congested state, and FIG. 5 is the sequence diagram showing an example of how the congestion control system according to the exemplary embodiment of the present invention operates during the heavily congested state, both of which are shown by taking the operation of the congestion control system 3 of FIG. 1 as an example. FIG. 6 is the sequence diagram for explaining the congestion control operation performed in the conventional IP telephony network.

First, description will be made of the congestion control operation performed in the conventional IP telephony network. As shown in FIG. 6, in a case of the conventional IP telephony network, during a normal state, a connection is established with respect to the call control server 5 in response to a call initiation request from the IP communication terminal such as the telephone 10 (Sequence SQ21). Even during the congested state, when the call initiation request is made from the IP communication terminal such as the telephone 10, a connection is established with respect to the call control server 5 (Sequence SQ22). After that, for notification of the congested state, a connection is established with respect to the guidance server (Sequence SQ23), and a guidance reproduction service is provided to the IP communication terminal such as the telephone 10 of the source of the call initiation request from the guidance server via a route passing the call control server 5 (Sequence SQ24). In other words, irrespective of which of the normal state and the congested state the system is in, such control is performed as to perform communication via the call control server 5 in response to every call initiation request.

On the other hand, as shown in FIG. 4, in the congestion control system 3 according to the present invention during a normal state, similarly to the conventional IP telephony network, a connection is established with respect to the call control server 5 via the service edge node 1 when a call initiation request is made from the IP communication terminal such as the telephone 10 (Sequence SQ1). However, when the service edge node 1 receives a notification of a lightly congested state from the external device such as the congestion control node 4 for monitoring the congested state of the host-side device such as the call control server 5 (Sequence SQ2), the connection destination of the call initiation request is changed depending on the content of the notified lightly congested state and the priority assigned to the IP communication terminal that has made the call initiation request. Note that the notification of a congested state is issued not only by an instruction from the external device such as the congestion control node 4 but also by such human intervention that a user inputs a command for regulating the call initiation. There may be a case where the service edge node 1 switches the connection destination autonomously based on a threshold (a predetermined number of calls or amount of calls per unit time or the number of simultaneous connections) preset for a traffic processing performed by the service edge node 1.

Even when the service edge node 1 is set to switch the connection destination into the guidance server 2, in a case where the call initiation request has been made from the IP communication terminal (such as the telephone 10) of the subscriber A 12 being a prioritized subscriber, a connection is established with respect to the call control server 5 similarly to the case of the normal state (Sequence SQ3). On the other hand, in a case where the call initiation request has been made from the IP communication terminal (such as the telephone 10) of the subscriber B 13 being a general subscriber (Sequence SQ4), the service edge node 1 transfers the call initiation request to the guidance server 2 (Sequence SQ5). Upon reception of the call initiation request from the service edge node 1, the guidance server 2 reproduces a guidance for notification of a congested state with respect to the IP communication terminal (such as the telephone 10) of the subscriber B 13 being a general subscriber (Sequence SQ6).

The guidance server 2 transmits a connection impossibility notification signal to the IP communication terminal such as the telephone 10 depending on whether or not the threshold preset as the number of calls that can be processed is exceeded due to the traffic concentration of call initiation requests on the call control server 5 or depending on the content indicated by the notification of the congested state received from the congestion control node 4 or the like (Sequence SQ7). Note that the device for terminating the connection impossibility notification signal may be the IP communication terminal such as the telephone 10, or may be the access network 8 or the gateway 9.

When the IP communication terminal such as the telephone 10, the access network 8, the gateway 9, or the like receives a connection impossibility notification signal from the guidance server 2, it is possible, based on the content of the connection impossibility notification signal, to display to the effect that the call cannot be connected on the display of the IP communication terminal such as the telephone 10 and to reproduce a voice guidance or a video guidance with respect to the IP communication terminal such as the telephone 10. Each of the IP communication terminal such as the telephone 10, the access network 8, the gateway 9, and the like has a mechanism for regulating the call initiation so as not to receive a subsequent call initiation request, and can regulate the call initiation by receiving the connection impossibility notification signal from the guidance server 2.

Next, description will be made of a case where the host-side device such as the call control server 5 has fallen into a heavily congested state. As shown in FIG. 5, in the congestion control system 3 according to the present invention during a normal state, similarly to the conventional IP telephony network, a connection is established with respect to the call control server 5 when a call initiation request is made from the IP communication terminal such as the telephone 10 (Sequence SQ11). However, when the service edge node 1 receives a notification of a heavily congested state from the external device such as the congestion control node 4 for monitoring the congested state of the host-side device such as the call control server 5 (Sequence SQ12), and when the call initiation request is made from the subscriber (Sequences SQ13 and SQ17), the service edge node 1 transfers any call initiation request received from any subscriber including a prioritized subscriber to the guidance server 2 (Sequences SQ14 and SQ18). As a result, irrespective of whether or not the subscriber is prioritized, the IP communication terminal such as the telephone 10 receives a guidance reproduction and/or connection impossibility notification signal from the guidance server 2 (Sequences SQ15 and SQ19 and/or SQ16 and SQ20).

Description of Effects

In the IP telephony network, as distinct from the conventional telephone network based on a telephone switchboard, the call control servers 5 for accommodating subscribers are not distributed in different locations, so if traffic occurs concentratedly, the congested state occurs with ease, thereby leading to a state where the IP telephone call is hard to be connected or cannot be connected at all. In addition, if the congested state progresses, the influence spreads over the entire system across the IP telephony network, which requires considerable time to identify a congestion factor (failure site) or recover the normal state.

In contrast, the congestion control system according to the present invention is configured by disposing the service edge node 1 for controlling the call initiation of an IP telephone operated by a subscriber based on the congested state and the guidance server 2 for transmitting various guidance services (such as a voice guidance and a video guidance) to the subscriber in the edge region serving as a connection part between the access network 8 and the core network 6, thereby making it possible to appropriately regulate a call initiation request from the subscriber's IP communication terminal such as the telephone 10 or the PC 11 based on the congested state at the entrance to the IP telephony network.

Accordingly, it is possible to prevent the traffic at the entrance from being concentrated on the host-side core network 6, call control server 5, or the like that accommodates subscribers for IP telephones, and to further prevent the congested state from spreading over the entire system across the IP telephony network. Further, by using the guidance server 2, the voice guidance for notifying a subscriber of the occurrence of the congested state is reproduced, or guidance information (such as a video guidance) is displayed on a display of the IP communication terminal owned by the subscriber, thereby making it possible to positively provide the subscriber with appropriate information.

Hereinabove, description has been made of the configuration of the preferred exemplary embodiment of the present invention. However, it should be noted that the exemplary embodiment is shown merely as an example of the present invention, and does not limit the present invention to any specific form. It could be easily understood by a person skilled in the art that various modifications and variations can be made depending on particular applications without departing from the gist of the present invention described in the scope of the claims appended hereto. In particular, it is noted that the following modifications are available.

(1) The service edge node may control the IP telephone call initiation request received from the IP communication terminal based on the congested state of the core network and a priority assigned to the subscriber for an IP telephone.

(2) During a normal state in which the core network is not in the congested state, irrespective of the priority assigned to the subscriber, in response to every IP telephone call initiation request received from the IP communication terminal of the subscriber, the service edge node may establish a connection between the IP communication terminal and a call control server, which belongs to the core network, for accommodating the subscriber and performing an IP telephone connection control.

(3) The service edge node may be configured to: perform, in a case where the core network is in a lightly congested state, a connection with respect to the call control server in response to the IP telephone call initiation request received from the IP communication terminal of a prioritized subscriber having a high priority; and transfer the IP telephone call initiation request received from the IP communication terminal of a general subscriber having a low priority to the guidance server, and the guidance server may transmit a guidance indicating an occurrence of the congested state to the IP communication terminal of a call initiation source.

(4) The service edge node may transfer, in a case where the core network is in a heavily congested state, all of the IP telephone call initiation requests received from the IP communication terminals of subscribers to the guidance server irrespective of the priority assigned to the subscriber, and the guidance server may transmit guidance information indicating an occurrence of the congested state to the IP communication terminal of the call initiation source.

(5) The service edge node may receive a notification of the congested state of the core network from an external portion including a congestion control node for detecting the congested state of each device belonging to the core network, to thereby control the IP telephone call initiation request received from the IP communication terminal based on the congested state of the core network received from the external portion.

(6) The service edge node may control the IP telephone call initiation request received from the IP communication terminal based on an instruction of a command inputted by a user.

(7) The service edge node may control the IP telephone call initiation request received from the IP communication terminal autonomously based on whether or not a traffic amount of the service edge node exceeds a preset threshold.

(8) The threshold for the traffic amount of the service edge node may include at least one of a per-unit-time number of calls, a per-unit-time amount of calls, and a number of simultaneous connections.

(9) When the IP telephone call initiation request received from the IP communication terminal is transferred, the guidance server may transmit a guidance using one of a voice and a video that indicates the congested state of the core network as the guidance information to be transmitted to the IP communication terminal of the call initiation source.

(10) When the IP telephone call initiation request received from the IP communication terminal is transferred, the guidance server may transmit a connection impossibility notification signal indicating that a connection to the IP communication terminal of the call initiation source has been rejected.

(11) When the connection impossibility notification signal is received from the guidance server, the IP communication terminal may be set to a call initiation regulation state in which an IP telephone call initiation operation is inhibited.

(12) When the connection impossibility notification signal is received from the guidance server, the IP communication terminal may edit a content of connection rejection indicated by the connection impossibility notification signal into information that can be notified to the user, and displays the information on a screen of a display of the IP communication terminal.

(13) When the connection impossibility notification signal is received by one of the access network for relaying and transferring the connection impossibility notification signal to be transmitted from the guidance server to the IP communication terminal of the call initiation source and a gateway device having a gateway function with respect to the access network, the congestion control system may set the one of the access network and the gateway device to a call initiation regulation state in which a call initiation request with respect to the core network is inhibited.

(14) The congestion control system may cause one of the access network for relaying and transferring the connection impossibility notification signal to be transmitted from the guidance server to the IP communication terminal of the call initiation source and a gateway device having a gateway function with respect to the access network to terminate the connection impossibility notification signal, generate a message in one of a voice format and a video format from a content of connection impossibility indicated by the connection impossibility notification signal, and transmit the message to the IP communication terminal of the call initiation source.

With the congestion control system, the service edge node, the guidance server, the congestion control method, the congestion control program, and the program recording medium according to the present invention, the following effects can be obtained.

In the IP telephony network, as distinct from the conventional telephone network based on a telephone switchboard, the call control servers for accommodating subscribers are not distributed in different locations, so if traffic occurs concentratedly, the congested state occurs with ease, thereby leading to a state where the IP telephone call is hard to be connected or cannot be connected at all. In addition, if the congested state progresses, the influence spreads over the entire system across the IP telephony network, which requires considerable time to identify a congestion factor (failure site) or recover the normal state.

The congestion control system according to the present invention is configured by disposing the service edge node for controlling the call initiation of an IP telephone operated by a subscriber based on the congested state and the guidance server for transmitting various guidances (such as a voice guidance and a video guidance) to the subscriber in the edge region serving as a connection part between the access network and the core network, thereby making it possible to appropriately regulate a call initiation request from the subscriber's IP communication terminal such as a telephone or a PC based on the congested state at the entrance to the IP telephony network.

Accordingly, it is possible to prevent the traffic at the entrance from being concentrated on the host-side core network, call control server, or the like that accommodates subscribers for IP telephones, and to further prevent the congested state from spreading over the entire system across the IP telephony network. Further, by using the guidance server, the voice guidance for notifying a subscriber of the occurrence of the congested state is reproduced, or guidance information (such as a video guidance) is displayed on a display of the IP communication terminal owned by the subscriber, thereby making it possible to positively provide the subscriber with appropriate information.

What is claimed is:

1. A congestion control system for controlling a congestion of an IP telephony network in which a communication processing of a telephone call is performed by use of an IP packet, comprising:

a service edge node for controlling an IP telephone call initiation request received from an IP communication terminal based on a congested state of a call control server connected to a core network for providing a subscriber with an IP telephone service; and a guidance server for providing a guidance service to the IP communication terminal without intermediation of the core network, the service edge node and the guidance server being disposed in an edge region located between an access network for connection to the IP communication terminal of the subscriber and the core network, wherein the service edge node is to control the IP telephone call initiation request based on monitoring the congested state of the call control server by a congestion control node, and by receiving a signal from the congestion control node indicating the congested state of the call control server, wherein the service edge node controls the IP telephone call initiation request received from the IP communication terminal based on the congested state of the call control server and a priority assigned to the subscriber for an IP telephone, and wherein the service edge node is configured to:

perform, in a case where the call control server is in a lightly congested state, a connection with respect to the call control server in response to the IP telephone call initiation request received from the IP communication terminal of a prioritized subscriber having a high priority; and transfer the IP telephone call initiation request received from the IP communication terminal of a general subscriber having a low priority to the guidance server; and the guidance server transmits a guidance indicating an occurrence of the congested state to the IP communication terminal of a call initiation source.

2. A congestion control system according to claim 1, wherein, during a normal state in which the call control server is not in the congested state, irrespective of the priority assigned to the subscriber, in response to every IP telephone call initiation request received from the IP communication terminal of the subscriber, the service edge node establishes a connection between the IP communication terminal and the call control server, for accommodating the subscriber and performing an IP telephone connection control.

3. A congestion control system according to claim 1, wherein the service edge node receives a notification of the congested state of the call control server from an external portion including a congestion control node for detecting the congested state of each device belonging to the core network, to thereby control the IP telephone call initiation request received from the IP communication terminal based on the congested state of the core network received from the external portion.

4. A congestion control system according to claim 1, wherein the service edge node controls the IP telephone call initiation request received from the IP communication terminal based on an instruction of a command inputted by a user.

5. A congestion control system according to claim 1, wherein the service edge node controls the IP telephone call initiation request received from the IP communication terminal autonomously based on whether or not a traffic amount of the service edge node exceeds a preset threshold.

6. A congestion control system according to claim 5, wherein the threshold for the traffic amount of the service edge node comprises at least one of a per-unit time number of calls, a per-unit-time amount of calls, and a number of simultaneous connections.

7. A congestion control system according to claim 1, wherein, when the IP telephone call initiation request received from the IP communication terminal is transferred, the guidance server transmits a guidance using one of a voice and a video that indicates the congested state of the call control server as the guidance information to be transmitted to the IP communication terminal of the call initiation source.

8. A congestion control system according to claim 1, wherein, when the IP telephone call initiation request received from the IP communication terminal is transferred, the guidance server transmits a connection impossibility notification signal indicating that a connection to the IP communication terminal of the call initiation source has been rejected.

9. A congestion control system according to claim 8, wherein when the connection impossibility notification signal is received from the guidance server, the IP communication terminal is set to a call initiation regulation state in which an IP telephone call initiation operation is inhibited.

10. A congestion control system according to claim 8, wherein when the connection impossibility notification signal is received from the guidance server, the IP communication terminal edits a content of connection rejection indicated by the connection impossibility notification signal into information that can be notified to the user, and displays the information on a screen of a display of the IP communication terminal.

11. A congestion control system according to claim 8, wherein when the connection impossibility notification signal is received by one of the access network for relaying and transferring the connection impossibility notification signal to be transmitted from the guidance server to the IP communication terminal of the call initiation source and a gateway device having a gateway function with respect to the access network, the congestion control system sets the one of the access network and the gateway device to a call initiation regulation state in which a call initiation request with respect to the core network is inhibited.

12. A congestion control system according to claim 8, wherein the congestion control system causes one of the access network for relaying and transferring the connection impossibility notification signal to be transmitted from the guidance server to the IP communication terminal of the call initiation source and a gateway device having a gateway function with respect to the access network to terminate the connection impossibility notification signal, generate a message in one of a voice format and a video format from a content of connection impossibility indicated by the connection impossibility notification signal, and transmit the message to the IP communication terminal of the call initiation source.

13. A congestion control system for controlling a congestion of an IP telephony network in which a communication processing of a telephone call is performed by use of an IP packet, comprising:
    a service edge node for controlling an IP telephone call initiation request received from an IP communication terminal based on a congested state of a call control server connected to a core network for providing a subscriber with an IP telephone service; and
    a guidance server for providing a guidance service to the IP communication terminal without intermediation of the core network,
    the service edge node and the guidance server being disposed in an edge region located between an access network for connection to the IP communication terminal of the subscriber and the core network,
    wherein the service edge node is to control the IP telephone call initiation request based on monitoring the congested state of the call control server by a congestion control node, and by receiving a signal from the congestion control node indicating the congested state of the call control server,
    wherein the service edge node controls the IP telephone call initiation request received from the IP communication terminal based on the congested state of the call control server and a priority assigned to the subscriber for an IP telephone,
    wherein the service edge node transfers, in a case where the call control server is in a heavily congested state, all of the IP telephone call initiation requests received from the IP communication terminals of subscribers to the guidance server irrespective of the priority assigned to the subscriber; and
    wherein the guidance server transmits guidance information indicating an occurrence of the congested state to the IP communication terminal of the call initiation source.

14. A congestion control method of controlling a congestion of an IP telephony network in which a communication processing of a telephone call is performed by use of an IP packet, comprising:
    controlling, by a service edge node disposed in an edge region located between an access network for connection to an IP communication terminal of a subscriber and a core network for providing the subscriber with an IP telephone service, an IP telephone call initiation request received from the IP communication terminal based on a congested state of a call control server connected to the core network;
    providing, by a guidance server disposed in the edge region, a guidance service to the IP communication terminal;
    monitoring the congested state of the call control server, by a congestion control node;
    receiving a signal by a service edge node from the congestion control node indicating the congested state of the call control server;
    controlling the IP telephone call initiation request, by the service edge node, based on monitoring the congested state of the call control server by the congestion control node, via the signal received by the service edge node from the congestion control node;
    controlling, by the service edge node, the IP telephone call initiation request received from the IP communication terminal based on the congested state of the call control server and a priority assigned to the subscriber for an IP telephone;
    performing, by the service edge node, in a case where the call control server is in a lightly congested state, a connection with respect to the call control server in response to the IP telephone call initiation request received from the IP communication terminal of a prioritized subscriber having a high priority;
    transferring, by the service edge node, the IP telephone call initiation request received from the IP communication terminal of a general subscriber having a low priority to a guidance server; and transmitting, by the guidance server, a guidance indicating an occurrence of the congested state to the IP communication terminal of a call initiation source.

15. A congestion control method according to claim 14, further comprising establishing, by the service edge node, during a normal state in which the call control server is not in the congested state, irrespective of the priority assigned to the subscriber, in response to every IP telephone call initiation request received from the IP communication terminal of the subscriber, a connection between the IP communication terminal and the call control server, for accommodating the subscriber and performing an IP telephone connection control.

16. A congestion control method according to claim 14, further comprising transmitting, by the guidance server, when the IP telephone call initiation request received from the IP communication terminal is transferred, a guidance using one of a voice and a video that indicates the congested state of the call control server as the guidance information to be transmitted to the IP communication terminal of the call initiation source.

17. A congestion control method according to claim, further comprising transmitting, by the guidance server, when the IP telephone call initiation request received from the IP communication terminal is transferred, a connection impossibility notification signal indicating that a connection to the IP communication terminal of the call initiation source has been rejected.

18. A congestion control method of controlling a congestion of an IP telephony network in which a communication processing of a telephone call is performed by use of an IP packet, comprising:
controlling, by a service edge node disposed in an edge region located between an access network for connection to an IP communication terminal of a subscriber and a core network for providing the subscriber with an IP telephone service, an IP telephone call initiation request received from the IP communication terminal based on a congested state of a call control server connected to the core network;
providing, by a guidance server disposed in the edge region, a guidance service to the IP communication terminal;
monitoring the congested state of the call control server, by a congestion control node;
receiving a signal by a service edge node from the congestion control node indicating the congested state of the call control server;
controlling the IP telephone call initiation request, by the service edge node, based on monitoring the congested state of the call control server by the congestion control node, via the signal received by the service edge node from the congestion control node;
controlling, by the service edge node, the IP telephone call initiation request received from the IP communication terminal based on the congested state of the call control server and a priority assigned to the subscriber for an IP telephone;

transferring, by the service edge node, in a case where the call control server is in a heavily congested state, all of the IP telephone call initiation requests received from the IP communication terminals of subscribers to the guidance server irrespective of the priority assigned to the subscriber; and
transmitting, by the guidance server, guidance information indicating an occurrence of the congested state to the IP communication terminal of the call initiation source.

19. A non-transitory computer-readable data storage medium storing a computer-executable computer program for controlling congestion of an IP telephony network in which communication processing of a telephone call is performed by use of an IP packet,
the computer program being executed by a computing device disposed in an edge region located between an access network for connection to an IP communication terminal of a subscriber and a core network for providing the subscriber with an IP telephone server,
wherein execution of the computer program by the computing device causes a method to be performed, the method comprising:
transferring, based on a congested state of a call control server connected to the core network, an IP telephone call initiation request received from the IP communication terminal to one of the call control server and a guidance server that is disposed in the edge region to provide a guidance service to the IP communication terminal;
monitoring the congested state of the call control server, by a congestion control node;
receiving a signal by a service edge node from the congestion control node indicating the congested state of the call control server;
controlling the IP telephone call initiation request, by the service edge node, based on monitoring the congested state of the call control server by the congestion control node, via the signal received by the service edge node from the congestion control node;
controlling, by the service edge node, the IP telephone call initiation request received from the IP communication terminal based on the congested state of the call control server and a priority assigned to the subscriber for an IP telephone;
performing, by the service edge node, in a case where the call control server is in a lightly congested state, a connection with respect to the call control server in response to the IP telephone call initiation request received from the IP communication terminal of a prioritized subscriber having a high priority;
transferring, by the service edge node, the IP telephone call initiation request received from the IP communication terminal of a general subscriber having a low priority to a guidance server; and
transmitting, by the guidance server, a guidance indicating an occurrence of the congested state to the IP communication terminal of a call initiation source.

* * * * *